United States Patent
Becker et al.

[11] 3,896,306
[45] July 22, 1975

[54] FAST-NEUTRON SOLID-STATE DOSIMETER

[75] Inventors: Klaus H. Becker; Fred F. Haywood; Philip T. Perdue; John H. Thorngate, all of Oak Ridge, Tenn.

[73] Assignee: The United States of America as represented by the United States Energy Research and Development Administration, Washington, D.C.

[22] Filed: June 20, 1974

[21] Appl. No.: 481,262

[52] U.S. Cl............................... 250/392; 250/484
[51] Int. Cl.²...................... H05B 33/00; G01T 3/00
[58] Field of Search .......... 250/484, 486, 390, 483, 250/518, 392; 253/301.3 R

[56] References Cited
UNITED STATES PATENTS

| | | |
|---|---|---|
| 3,450,641 | 6/1969 | Schimitschek et al. ...... 252/301.3 R |
| 3,471,699 | 10/1969 | McCall........................ 253/301.3 R |
| 3,485,766 | 12/1969 | Yamashita et al. .......... 252/301.3 R |
| 3,761,710 | 9/1973 | Yamashita et al................. 250/484 |

Primary Examiner—Harold A. Dixon
Attorney, Agent, or Firm—Dean E. Carlson; David S. Zachry; Louis M. Deckelmann

[57] ABSTRACT

A fast-neutron solid-state dosimeter for personnel dosimetry has been provided which involves permanently and intimately mixing a thermoluminescent detector (TLD) material with a high-melting organic compound having a high hydrogen content. This dosimeter employs recoil proton registration with the TLD material, the recoil protons being formed by the interactions of fast neutrons with the hydrogen of the organic substance. Choice of an organic which does not melt or otherwise degrade below about 300°C permits reading the TLD without previous separation, and the reuse of the dosimeter.

5 Claims, 1 Drawing Figure

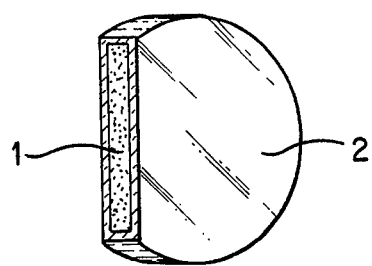

FAST-NEUTRON SOLID-STATE DOSIMETER

BACKGROUND OF THE INVENTION

This invention was made in the course of, or under, a contract with the U.S. Atomic Energy Commission.

For the past twenty years nuclear track emulsion films have been utilized for fast neutron dosimetry. During this time it has become apparent that the accuracy, dynamic range, and reliability of such film are severely limited due to several of its properties. Probably the largest single factor is the rapid fading of the latent recoil proton tracks in the presence of oxygen and water vapor. Even with the film protected in envelopes, high relative humidities prevent accurate use of the film. However, a search for a replacement dosimetry material has not as yet produced a completely satisfactory solution.

Solid-state detectors have been one means of measuring neutrons using a subtractive method. This involves exposing two detectors to a field of mixed radiation but eliminating the neutron response of one. Thus, one detector recorded neutron and gamma dose information and the other detector recorded only the gamma dose. The neutron dose was determined by subtracting one value from the other.

One area of research has been directed toward the use of thermoluminescent detector (TLD) materials whereby recoil protons from a hydrogenous material, when subjected to fast neutrons, are recorded. The light output of the TLD materials, as they are subsequently heated, is a function of the total adsorbed dose from fast neutrons. Materials such as LiF:Mg,Ti in alcohol have been used. Other investigators have combined TL phosphors with solid organic materials either by covering the solid TL phosphor with radiator foils or intimately mixing them. In the latter case a phosphor such as $CaSO_4$:Tm has been mixed with a water-soluble radiator such as glucose. In all the known prior recoil proton registration research, the TL material must be separated from the radiator material before readout because the radiator cannot be heated to the temperatures necessary to develop the light output of the TL material (200°–250°C). Most hydrogenous radiator materials undergo melting or rapid deterioration when heated repeatedly to such temperatures. Accordingly, none of these systems are very practical for personnel dosimetry.

Thus, there exists a need for a fast-neutron solid-state dosimeter that can be read out without the necessity of separating the radiator from the TL material, that can withstand temperatures of at least 300°C for short intervals, and that can be reused a plurality of times. The present invention was conceived to meet this need in a manner to be described hereinbelow.

SUMMARY OF THE INVENTION

It is the object of the present invention to provide an improved fast-neutron solid-state dosimeter that does not require separation of materials before it can be read out, that utilizes materials that do not melt or otherwise degrade at about a 300°C readout temperature, that provides a more efficient dosimeter, and that can be reused.

The above object has been accomplished in the present invention by intimately mixing a TL material, such as $CaSO_4$:Dy, with a powdered polyphenyl, such as p-sexiphenyl, and hot-pressing the mixture to form pellets, followed by out-gassing in a vacuum furnace at 150°C prior to first use as dosimeters. It may be noted that an increase in the ultraviolet light sensitivity was observed only in the p-sexiphenyl-embedded material and not in a Teflon-embedded material used as gamma radiation detector.

BRIEF DESCRIPTION OF THE DRAWING

The single FIGURE is a cut-away view of the dosimeter pellet encased with a heat-resistant enclosure in accordance with the present invention.

DESCRIPTION OF THE PREFERRED EMBODIMENTS

The dosimeters of the present invention were prepared in the manner now to be described. Specifically, pellets of about 6 mm diameter and less than 1 mm thick, weighing about 50 mg, were prepared by mixing equal proportions (by weight) of finely powdered (average grain diameter about 4 $\mu$m) $CaSO_4$:Dy or $CaSO_4$:Tm with powdered p-sexiphenyl which had previously been highly purified. The mixture was hot-pressed at 200°C using a pressure of 2,000 kg/cm$^2$. The samples were outgassed overnight in a vacuum furnace in order to eliminate the sublimation of impurities from the p-sexiphenyl at high temperatures during the readout cycle after exposure of the detectors to a source of radiation. A typical dosimeter pellet is illustrated in the cut-away view as shown in the single FIGURE in the drawing, wherein the pellet is shown by the reference numeral 1, and when desired or required for reasons set forth hereinbelow, the pellet 1 is encased with a heat-resistant enclosure 2 which may be glass for example. The dosimeter illustrated in the drawing is drawn to a larger scale than the actual dosimeter size for the sake of clarity. Similar pellets were made by mixing the $CaSO_4$:Dy material with powdered Teflon which does not contain hydrogen and is, therefore, much less sensitive to fast neutrons. The detectors were annealed at 280°C (Teflon) and 350°C (p-sexiphenyl), respectively, in an inert atmosphere for 2 hours prior to use and/or reuse. No residual thermoluminescent signal could be detected after this treatment, and there was no change in sensitivity during multiple use.

Comparative tests were made between the Teflon and p-sexiphenyl detectors by subjecting each to a field of mixed neutron and gamma radiation from a fission source and to a neutron beam from the $d,T$ reaction. For these tests, the Teflon-embedded detectors were exposed within a Teflon shield, and the p-sexiphenyl-embedded detectors were exposed within a polyethylene shield of about 2 mm thickness in order to establish recoil proton equilibrium. After irradiation, the detectors were gradually heated in an inert atmosphere to about 250°C and the light output, which peaks near 200°C, was determined in a conventional TLD reader as a measure of dose received by the dosimeter material. The results of various exposures of the detectors to mixed neutron and gamma radiation fields are summarized in the following table.

TABLE

| Radiation Source | Sexiphenyl/ Teflon Response Ratio | Neutron/$\gamma$ Dose Ratio (rad/rad) | Recoil Proton Efficiency |
| --- | --- | --- | --- |
| HPRR Reactor | 3 | 7 | 0.4 |

TABLE-Continued

| Radiation Source | Sexiphenyl/ Teflon Response Ratio | Neutron/γ Dose Ratio (rad/rad) | Recoil Proton Efficiency |
|---|---|---|---|
| 14 MeV (d,T) | 10 | 25 | 0.4 |

As can be seen, the relative efficiency of the phosphor to recoil protons amounts to about 40% for both fission and 14 MeV neutrons. A further reduction in the average size of the TLD particles would extend the range of the dosimeter to even lower neutron energies. Also, different weight ratios of organic to TLD phosphor may improve this response. The response of both the Teflon and the p-sexiphenyl-embedded detectors was a linear function of the gamma radiation dose from at least 1 to 1,000 rad. The standard deviation of the TL readings during multiple readings of the same and of different detectors amounted to less than 10%. Also, from the above table it can be seen that the p-sexiphenyl-embedded detectors, when exposed to the mixed radiation field of the HPRR, exhibit a response three times higher than the Teflon-embedded detectors having the same gamma radiation sensitivity.

The present invention is not restricted to the use of the above-mentioned materials and weight ratios in fabricating the dosimeters. For example, any of the known TL materials, such as $CaF_2$:Mn, $CaF_2$:Dy, BeO, $Li_2B_4O_7$:Mn, natural $CaF_2$, LiF:Mg,Ti, or $Mg_2SiO_4$:Tb may be utilized in the dosimeters to replace the $CaSO_4$:Dy or the $CaSO_4$:Tm. Also, the p-sexiphenyl may be replaced by other high-melting organics such as special polymers, or thermally stable inorganic compounds with a high hydrogen content such as certain metal hydrides; for example, lithium hydride. In the latter case, the mixture of the two constituents would have to be protected from humidity, for example by encapsulating in glass or coating with a high-melting polymer. The requirements with regard to the recoil proton "radiator" constituent are: a suitable hydrogen content (~4–12% by weight); a high degree of transparency to light from the TLD material; and an absence of volatilization, discolorization, or other deteriorization when heated repeatedly to about 300°C for short periods of time.

This invention has been described by way of illustration rather than by limitation and it should be apparent that it is equally applicable in fields other than those described.

What is claimed is:

1. An improved fast-neutron solid-state dosimeter comprising an intimate mixture of p-sexiphenyl and a finely powdered thermoluminescent material selected from the group consisting essentially of $CaSO_4$:Dy; $CaSO_4$:Tm; $CaF_2$:Dy; BeO; $CaF_2$:Mn; $Li_2B_4O_7$:Mn; natural $CaF_2$; LiF:Mg,Ti; and $Mg_2SiO_4$:Tb.

2. The dosimeter set forth in claim 1, wherein the intimate mixture of selected materials is hot-pressed to form a dense pellet.

3. The dosimeter set forth in claim 2, wherein said dosimeter pellet is encased with a light-transparent, heat-resistant enclosure.

4. The dosimeter set forth in claim 2, wherein the selected thermoluminescent material is $CaSO_4$:Dy.

5. The dosimeter set forth in claim 2, wherein the p-sexiphenyl and the selected thermoluminescent material of the intimate mixture have equal proportions, by weight.

* * * * *